United States Patent [19]

Kiehn

[11] Patent Number: 4,722,484
[45] Date of Patent: Feb. 2, 1988

[54] EXPANDABLE SOLID WASTE PROCESSING PLANT

[76] Inventor: Mogens Kiehn, P.O. Box 1561, Scottsdale, Ariz. 85252

[21] Appl. No.: 776,581

[22] Filed: Sep. 16, 1985

[51] Int. Cl.⁴ .............................................. B02C 21/00
[52] U.S. Cl. ................................... 241/65; 241/101.6; 241/DIG. 38
[58] Field of Search ..................... 241/65, 101.5, 101.6, 241/DIG. 38

[56] References Cited

U.S. PATENT DOCUMENTS 3,113,014  12/1963  Foth .......................... 241/DIG. 38
3,733,271  5/1973  Olsen ......................... 241/DIG. 38

Primary Examiner—Timothy V. Eley

[57] ABSTRACT

A waste meterial processing facility reduces the volume of waste material and produces an end product capable for use as construction building material. The waste material processing facility includes a conveyor belt for conveying the waste material to a shredding facility. The shredding facility controls the dimensions of the waste products being processed. An incinerator, for low heat incineration of the shredded materials includes pollution control devices for removing contaminates from the gases resulting from the incineration process. A facility is provided for solidifying, compacting, molding and glazing the char resulting from the incineration process into construction grade blocks. A scale house provides a first visual check of the materials being entered into the processing facility while a second check is derived by spreading the material in a dump area and consequently loading of the materials by front end loaders into a conveyor mechanism for transporting wast materials to the shredding facility. Television monitors can be provided for a permanent record of the activity of the disposal unit both for record keeping and as a possible legal evidence of activity. Deluge systems are provided in event of uncontrolled combustion of the waste materials.

11 Claims, 2 Drawing Figures

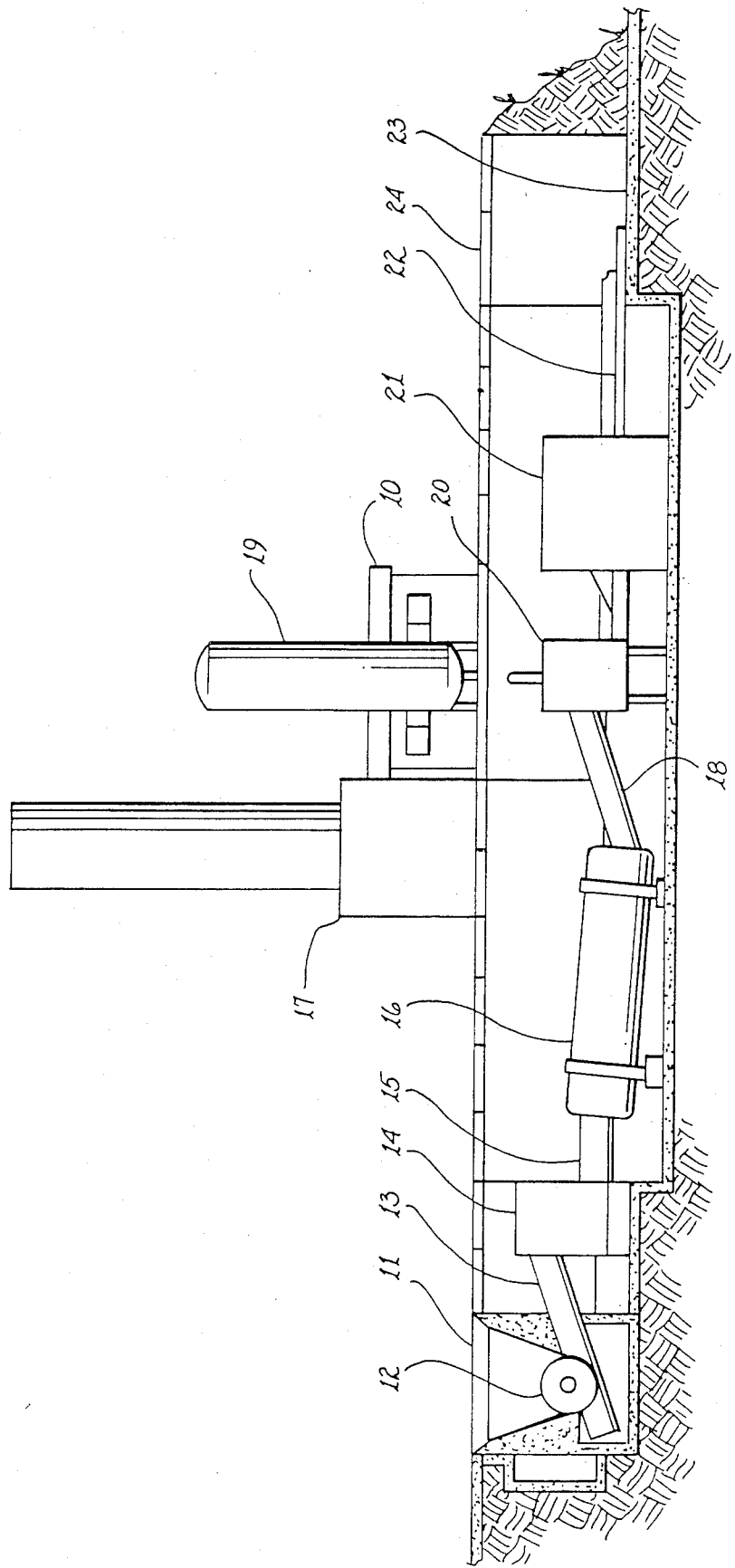

EXPANDABLE SOLID WASTE PROCESSING PLANT

BACKGROUND OF THE INVENTION

1. Field of the Invention

This invention relates generally to the processing of waste materials and, more particularly, to reducing the bulk of the waste material and processing the resulting waste material mass into a useful product.

2. Discussion of the Related Art

It is known in the related art to process waste materials in several elementary fashions. For example, much of the waste material in the United States is transported to appropriate sites and there, the waste material is deposited on the ground. After burning the waste material, the dumping site can be thereafter covered with a layer of dirt and the materials resulting from the incineration process permitted to decompose through natural processes. However, the available sites onto which waste material can be added are being filled by the large amount of waste material of modern society. In addition, the large volume of wastes deposited in this manner has begun to affect the purity of the ground water.

It is also known in situations where waste is produced near large bodes of water to place the waste materials on barges and dispose of the waste materials either in the large lakes or in the ocean. In an earlier day of less population and less waste, the large bodies of water appeared to have an endless capacity for absorbing waste materials. However, the amount of waste generated by the modern urban metroplexes is so large as to contaminate entire lakes and to raise the distinct possibility of contaminating much of the ocean. This contamination can have an adverse effect on the water supply.

A further method of disposal of waste has been to incinerate the waste with a high temperature process, thereby greatly reducing the volume of the waste material. The resulting mass can be used as landfill or disposing it in a large body of water. While having the advantage of providing a smaller quantity of polluting materials for disposal, this method has, however, the disadvantage of yielding an unacceptably large amount of gaseous pollutants of such a nature that removal of the pollutants from the escaping gas has been expensive and frequently ineffective.

A need has therefore been felt for a waste material processing facility that can reduce the quantity of waste material, provide a product that can have a significant, useful function, and completely consume the waste material so that disposal of a resulting product is not required. It is also desirable that the facility can be expandable as the population providing the waste material increases.

SUMMARY OF THE INVENTION

It is therefore an object of the present invention to provide an improved waste material processing system.

It is yet another object of the present invention to provide a waste material processing system that provides gaseous pollutants that can be removed before exposure to the atmosphere.

It is yet another object of the present invention to provide a waste disposal system with useful end product, an end product that can be used in a manner other than for increasing the volume of land in a selected portion or for disposal in the ocean.

It is yet another object of the present invention to provide a waste material processing system and method that can be expanded to accommodate additional volumes of waste materials.

It is yet another object of the present invention to provide a waste disposal system that is automatic and yet can be easily monitored to identify malfunctions.

The foregoing and other objects are accomplished, according to the present invention, by a waste material processing system that includes a conveyor belt onto which the waste material is loaded and a shredding system for preprocessing of the waste materials. The shredded waste materials are then incinerated by a low heat furnace. The low heat incinerator process produces gases from which undesirable pollutants can be relatively easily removed. The solid products from the incinerator process are fed into a chamber where an ash and liquid solidification material is mixed with the product of the incinerator chamber. Finally, the ash and solidifier mixture is compacted and molded into brick/block configuration. This brick/block configuration is then coated with a material that prevents dispersal of the materials of the block and provides for both easy stacking and for handling of the materials. The resulting blocks have sufficient structural integrity to be used for constructive purposes. Video units can monitor all of the processing facility and provide a record for later use.

These and other features of the present invention will be understood upon reading of the specification along with the accompanying figures.

BRIEF DESCRIPTION OF THE FIGURES

FIG. 2 is a cross-sectional view of the waste material processing system according to the present invention.

DESCRIPTION OF THE PREFERRED EMBODIMENT

Detailed Description of the Figures

Figure 1:
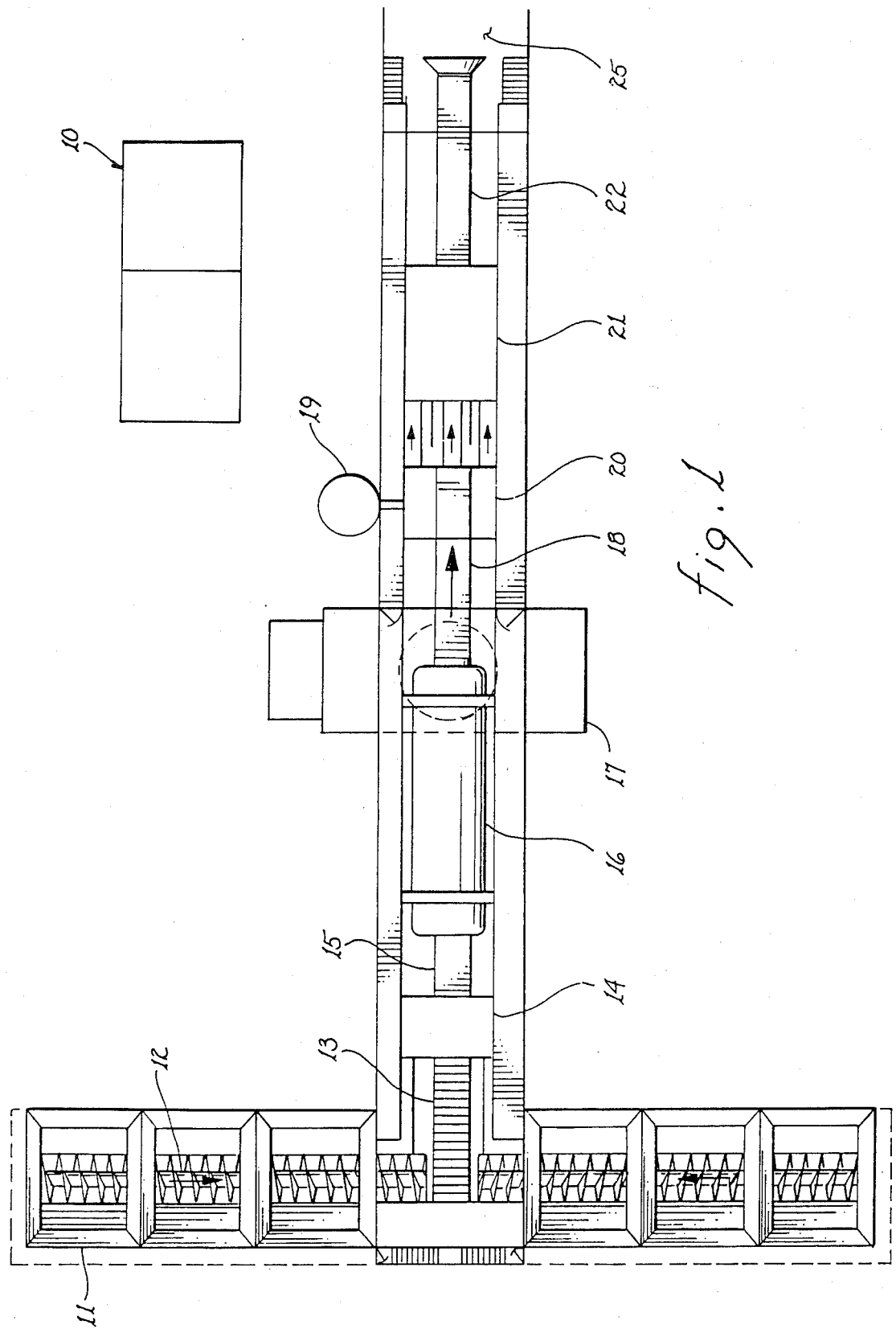
FIG. 1 is a top view of the waste material processing system according to the present invention.

Referring now to FIG. 1 and FIG. 2, scale house 10 is the entry point for receiving all vehicles carrying waste materials. The scale house 10 has apparatus associated therewith to weigh the incoming waste material transport units and compare this value with the weight of the waste material transport units after the waste has been removed. The waste carriers proceed to the dump area associated with the dump pits, in which the waste materials are dumped on the concrete surface. The dump pits 11 are generally modular and front loading apparatus can be used to move the waste from the dump areas into the dump pits 11. Overhead crane 5 with associated magnet is used to remove ferrous metals from the dump pit 12. At the bottom of the dump pit 11 is a feed auger 12, hydraulically driven that carries the waste into the next area of the waste material processing facility. The feed auger 12 can be hydraulically driven and can provide for automatic instantaneous reverse to provide a mechanism for clearing jams of waste material in the processing facility. The waste moved by the augers is deposited on pan feed conveyor 13 that conveys the waste material to the next stage of the processing facility. From the pan feed conveyor 13, the waste material is deposited into shredder 14. Shredder 14 includes a high speed fixed hammer with explosion vented panels. The shredder 14 insures that the waste material is below a minimum size, typically six inches on a dimension. The shredded material from shredder 14 is deposited on the enclosed pan feed conveyor 15 which conducts the material to the rotary incinerator 16. Associated with rotary incinerator 16 is pollution control equipment 17 that includes cyclones, back house precipitators, and furthermore includes a thermal heat recovery unit. The ash remaining from the incineration process is conveyed by enclosed pan feed conveyor 18 to the mixing drum 20. A storage tank 10 includes ash solidifier material and the combination of the ash and the ash solidifier material are mixed together in mixing drum 20. From the mixing drum 20, the combination of ash and ash solidifier material are moved to the brick/block densifier unit 21. The brick/block densifier unit includes apparatus for hydraulically compacting the ash and solidifier material into predetermined forms. The intensifier unit can eject the resulting product from the forms and has apparatus for providing glaze material on the ejected blocks. The glazed brick/block units are conveyed by flat belt conveyor 23 to an area 24 which can serve as a storage or as a stacking area.

Operation of the Preferred Embodiment

The present invention is based upon the use of low temperature incineration for volume reduction of the waste material. The end product of the incineration process is char. This char is used in association with a catalyst and a high pressure compactor to produce bricks or blocks that can be used in construction applications. The bricks can be made inert by being covered with a material or glaze to prevent moisture absorption and prevent deterioration of the char and catalyst. Because these bricks/blocks are formed under extremely high hydraulic pressure, their loading characteristics would be far superior to bricks/blocks fabricated by the typical procedures. The processing facility is designed not to release pollutants to the air and to provide a product that eliminates a need for waste disposal of unused or unusable materials.

The first area encountered by the waste material transport unit is the scale house 10. The scale house 10 has a number of responsibilities for ensuring the acceptance of proper materials for the processing activity. As is known, collection trucks used in the transport of waste materials can be divided into a number of categories: residential waste transport units, which are usually rear or side loaders and are used to collect residential waste from city streets, commercial waste transport units which are usually front loaders and roll-offs and collect solid waste from commercial, light industrial and apartment complexes; and construction debris transport units which are normally open top dump trucks hauling building and road demolition debris. Because the processing plant of the present incinerator is designed to handle residential and commercial waste, and some forms of wooden construction debris, the scale house operator will have no problem in distinguishing transports loaded with acceptable waste material. Overhead mirrors can be used by the scale house operator to view questionable loads of materials to verify their acceptability. In addition, warning signs can be posted describing unacceptable materials and explaining the legal ramifications associated with the dumping of illegal materials into the processing facility. Scale tickets would be signed by the truck drivers attesting to the fact that unacceptable materials were not dumped. All unloading areas would be constantly view by closed circuit television with records for use as evidence in courts of law in case of violation of regulations. Because all trucks are weighed incoming and weighed outgoing, the net material processed at the plant each day can be verified. Scale house personnel can be in charge of receiving "tipping fees" should there be a charge for dumping.

After an incoming waste transport unit is weighed, the tank proceeds to the "dumping area" and is directed to dump the waste material at a specific spot by the traffic director. All solid waste is deposited onto the concrete pad associated with the dump pit by the trucks and the waste material is, in turn, deposited into the modular dump pits by front end loaders. Unacceptable materials can be delivered by a waste material transport unit without the knowledge of the driver. The task of the front end loader operator is therefore very important because he can remove such material i.e., a large tree stump or automotive engine, before such material is deposited into the dump pits. Trash compactor trucks usually compact to a range of 3 to 1 and up to 8 to 1. By utilizing front end loaders, the compacted trash can be expanded or "fluffed" as it is deposited into the dumping pits for a more thorough inspection.

As the waste material is deposited into the dump pits, which can be lined with stainless steel sheet and plate, the waste material falls to an auger 12. The auger in turn feeds the material to the pan feed conveyor 13. in addition to its primary function of the feed auger 12 as a mover of materials, this mechanism also functions as a size reducer, cutting large boxes, wood and other items into small pieces. The auger is hydraulically driven and can have the unique feature of automatically reversing momentarily when a jam or stall occurs. The auger and housing are constructed of stainless steel also to facilitate periodic steam cleaning of the the dumping pit area.

A modular dumping pit concept is incorporated into the design so that the plant can be expanded as the community grows. The number of dumping pits 11 can be increased as the volume of processed waste material expands. For a large processing facility, the main processing line from item 13 through item 25 can be constructed as a dual main processing line with each processing constructed opposite of each other across the dumping pits 11.

Underground and parallel to each dumping pit can be an access tunnel for maintaining the auger feed system.

Each auger feed system deposits its material onto a stainless steel pan feed conveyor 13 which is hydraulically driven. The speed and feed rate is automatically controlled by the torque requirements of the shredder 14 into which the pan feed conveyor deposits materials. This control eliminates "choking" of the shredder by over feeding of waste materials. The shredder 14 reduces all materials to a size not larger than 6 inches in any direction. The shredder 14 incorporates a high speed motor with a torque sensor, which propels a shaft with fixed blades rotating over a six inch grate. The shredder also incorporates an explosion shock vent which reduces damage in the event of an explosion within the machine.

As the shredded waste material falls through the grate of shredder 14 onto the totally enclosed pan feed conveyor 15, the material is moved to the incinerator 16. The incinerator 16 is basically a single pass rotary furnace whose assistance fuel will be natural gas. Temperature control will be maintained by increasing or decreasing the amount of supplementary fuel (natural gas) used to assist the normal firing. Gas provided by the incineration of the waste materials can be recycled and used to assist in the incineration process. This control is necessary due to variations in humidity, rainfall and seasonal factors in the area where the plant is located.

In association with the incinerator 16 can be the necessary pollution control equipment 17 such as scrubbers, precipitators, fly ash cyclones and bag house, gas coolers and monitors. All informative data will be strip recorded and maintained in an active filing system.

As the material is charred and deposited from the incinerator onto a totally enclosed pan feed conveyor 18, the material is moved to the next station, a rotary mixing drum 20. A proportioned mix of the solidifying catalyst is thoroughly mixed with the char ash to form the raw material for the bricks/blocks, the product of the waste processing facility.

This raw material is sprayed with a glazing compound and hydraulically compacted into extrusion dies where the material is heated under pressure. The glazing precipitates to the outer surfaces of the brick as a result of the pressurized heating. As the material extrudes from the brick densifier 21, it is cut to the desired length and conveyed via a flat belt conveyor 22 to stacking area 23. In stacking area 23, the bricks are stacked on pallets and strapped for removal, by a fork lift, to the storage warehouse.

It is estimated that the time elapsed from dumping the material into the dump pit by the front loader, to producing a finished brick is approximately seven minutes.

The system control house located adjacent to the pollution control equipment 17 can include all the necessary control equipment and operators. Some of the equipment can include a sophisticated audio/video system viewing the dump area. Each individual component in the system can be covered by a video camera. Strategically placed heat sensors will detect and warn the operators of a possible fire hazard. In the event of a fire, a deluge system can be activated manually or will function automatically if not acted upon by the operators. All system functions will incorporate both audio (buzzers) and visual (flashing light) warning devices. That will notify the operators of a malfunction in the system. Walkways are provided on each side of the main line for maintenance and repair personnel.

To assure immediate access to any system component which requires major repairs, roof panels are fabricated from reinforced concrete and stainless steel frame and can be removed. The removal of the roof panels permits access to the machinery by a crane. When in place, these panels are flush with the concrete of the ground level and permit travel over the machinery.

All machinery and components can be manufactured with the material most compatible to the task at hand. In most cases this will be stainless steel. Bolts will be manufactured and classified as grade 8 in strength. The construction materials are chosen to permit periodic (daily) cleaning of the facility by water and by steam.

An added feature for the waste material processing facility is a low pressure steam system that will utilize the (waste) heat generated by the incinerator. This waste heat/steam system can power a low pressure steam turbine generator which, in turn, can produce all of the electrical energy requirements for this waste material processing plant, making the entire system self-sufficient in operation.

The foregoing description is included to illustrate the operation of the preferred embodiment and is not meant to limit the scope of the invention. The scope of the invention is to be limited only by the following claims. From the foregoing discussion, many variations will be apparent to one skilled in the art that would yet be emcompassed by the spirit and scope of the invention.

What is claimed is:

1. A waste processing plant comprising:
   conveyer means for receiving and transporting waste material;
   incinerator means for receiving said transported waste material and for incinerating said waste material with a low heat process;
   pollution control apparatus for purifying gases produced by said low heat process;
   storage means for storing a solidifying material;
   mixing means for mixing char resulting from said low heat incineration process with said solidifying material; and
   compacting means for compacting said char and said solidifying material into a shaped form.

2. The waste processing plant of claim 1 further comprising:
   glazing means for protecting said compacted and solidified char.

3. The waste processing plant of claim 1 further comprising:
   inspection means for inspecting said waste material prior to deposition of said waste material on said conveyor means.

4. The waste processing plant of claim 3 wherein said inspection means includes an area for distributing said waste materials prior to processing, said distributed waste material being usually inspected prior to being moved into said conveyor means.

5. The waste processing plant of claim 1 further comprising:
   storage means coupled to said compactor means for storing an ash solidifying materal.

6. A plant for processing waste material comprising:
   reduction means for reducing a volume of waste material, wherein said reduction means further comprises a low heat incinerator for the waste material and pollution control means for removing pollutants from gas from said low heat incinerator; and
   forming means including a solidifying material for forming said reduced volume of said waste material into a shape suitable for construction purposes.

7. The plant for processing waste materials of claim 6 wherein said reduction means further includes shredding means for controlling dimensions of materials applied to said low heat incineration means.

8. The plant for processing waste materials of claim 6 further including means for providing visual inspection of said waste materials prior to deposition in said reduction means.

9. The plant for processing waste materials of claim 6 wherein said forming means further includes hydraulic means for compacting said reduction means materials and said ash solidifying means in a form of predetermined size.

10. The plant for processing waste materials of claim 9 wherein said forming means includes glazing means for applying a protective covering to said compacted materials.

11. The plant for processing waste materials of claim 6 wherein said pollution means includes cyclones, bag house, precipitators and thermal recovery apparatus.

* * * * *